United States Patent [19]

Kuhn

[11] Patent Number: 4,531,757

[45] Date of Patent: Jul. 30, 1985

[54] TRACTOR HITCH ARRANGEMENT

[75] Inventor: John B. Kuhn, Mayville, Wis.

[73] Assignee: Deere & Company, Moline, Ill.

[21] Appl. No.: 588,829

[22] Filed: Mar. 12, 1984

[51] Int. Cl.³ .............................................. B60D 1/04
[52] U.S. Cl. .......................... 280/461 A; 280/490 A; 280/497; 172/448; 172/680
[58] Field of Search ............. 280/461 A, 461 R, 497, 280/490 R, 490 A, 504, 508, 512, 479 A, 488, 460 A; 180/53.3; 172/448, 439, 680, 272, 275, 450

[56] References Cited

U.S. PATENT DOCUMENTS

| | | | |
|---|---|---|---|
| 3,088,752 | 5/1963 | Dressen | 280/508 |
| 4,176,727 | 12/1979 | Perin | 180/53.3 |
| 4,214,636 | 7/1980 | Griffith | 172/450 |
| 4,366,967 | 1/1983 | Vollmer | 280/504 |

Primary Examiner—Joseph F. Peters, Jr.
Assistant Examiner—Everett G. Diederiks, Jr.

[57] ABSTRACT

A tractor hitch assembly including clamps mounted to the lower frame portion of a tractor. Each clamp comprised of a lug having a plurality of vertically elongated seats, and a clip pivotally mounted to the lug and having a plurality of vertically aligned C-shaped recesses. Each C-shape recess is cooperatively positioned with a respective seat to capture a pin associated with an implement support assembly.

2 Claims, 3 Drawing Figures

TRACTOR HITCH ARRANGEMENT

BACKGROUND OF THE INVENTION

This invention relates to tractor hitch arrangements.

It is known to use tractor hitch arrangements to facilitate the attachment of ground engaging implements to a tractor by an operator. One of the primary objectives in hitch design is to foster quick and easy implement attachment and release. Cost has also become a primary consideration especially when considering hitch arrangements for the smaller lawn and garden tractors. It is also beneficial for a tractor associated hitch arrangement to be easily cleanable to remove debris and soil from hitch clamps.

SUMMARY OF THE INVENTION

It is an objective of the present invention to present a tractor hitch arrangement which features quick implement attachment and release.

It is a further objective of the present invention to pesent a hitch arrangement which has a reduced manufacturing cost associated therewith and which provides easy access for cleaning.

A conventional tractor, more particularly of the lawn and garden type, will include a rock shaft pivotally mounted transversely to the rear of the tractor. A strap is fixably mounted to and extends generally perpendicular from the rock shaft in a rearward direction. A novel clamp is fixably mounted to each side of the lower rearward most portion of the tractor frame. Each clamp is comprised of a lug having a plurality of vertically spaced apart seats. A clip having a plurality of vertically spaced C-shaped recesses is pivotally mounted to the lug to enable transverse alignment of the C-shaped recesses to the lug seats.

An implement support arm arrangement includes a plurality of pins cooperatively positioned and sized to be received in a respective one of a complimentary pair of lug seats. Upon positioning of the pins in respective lug seats, a respective clip can be pivoted to allow a respective C-shaped recess to encompass a portion of the pin. The pin is, thereby, captured within the respective seat and C-shaped recess. A set pin can then be journaled transversely through a respective lug and clamp securing their relative position. The implement support arm will further include a vertically extending member which can be secured to the strap of the rock shaft.

DESCRIPTION OF THE PREFERRED EMBODIMENT

Figure 1:
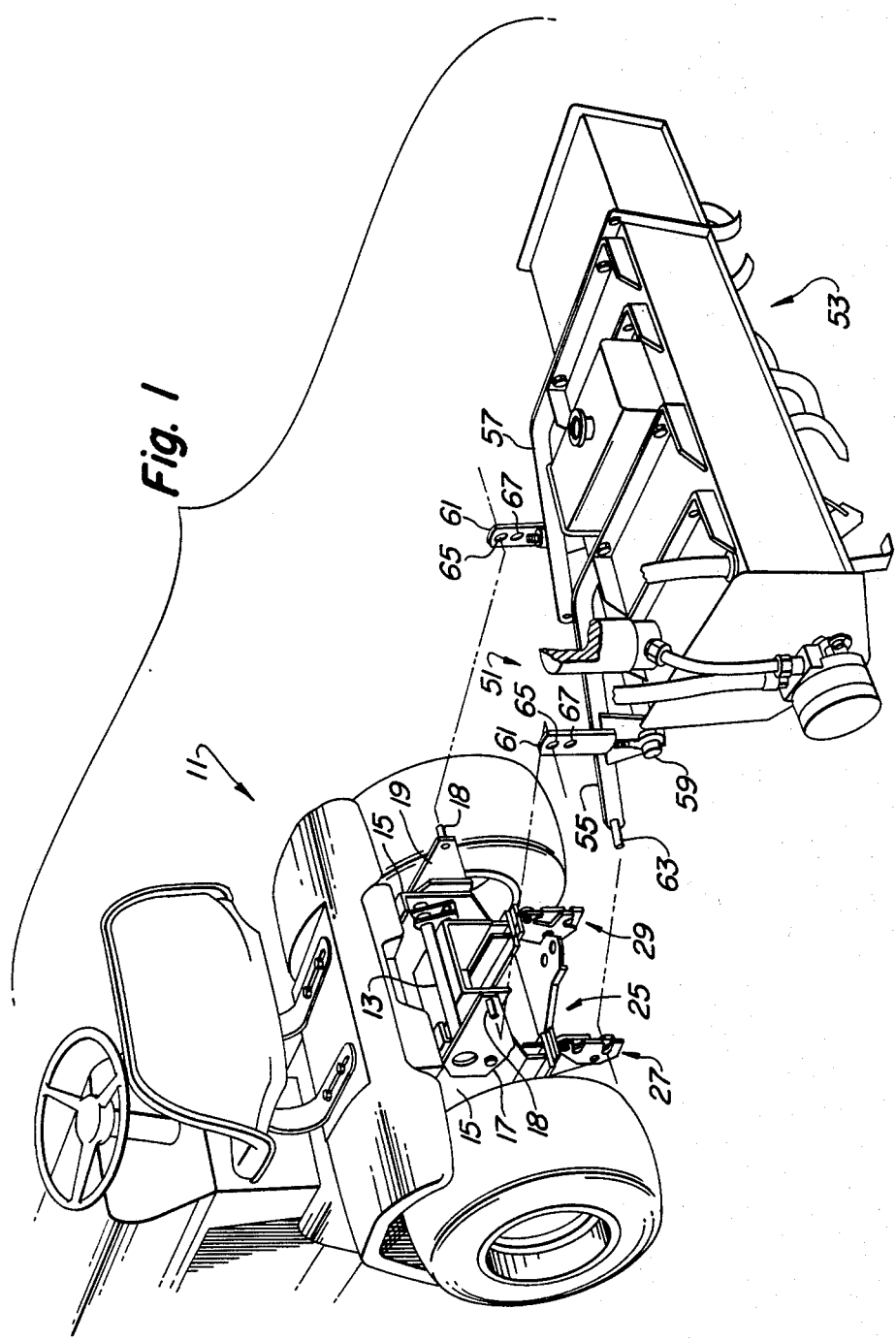
FIG. 1 is a prospective view hitch arrangement in accordance with the present invention.
Figure 3:
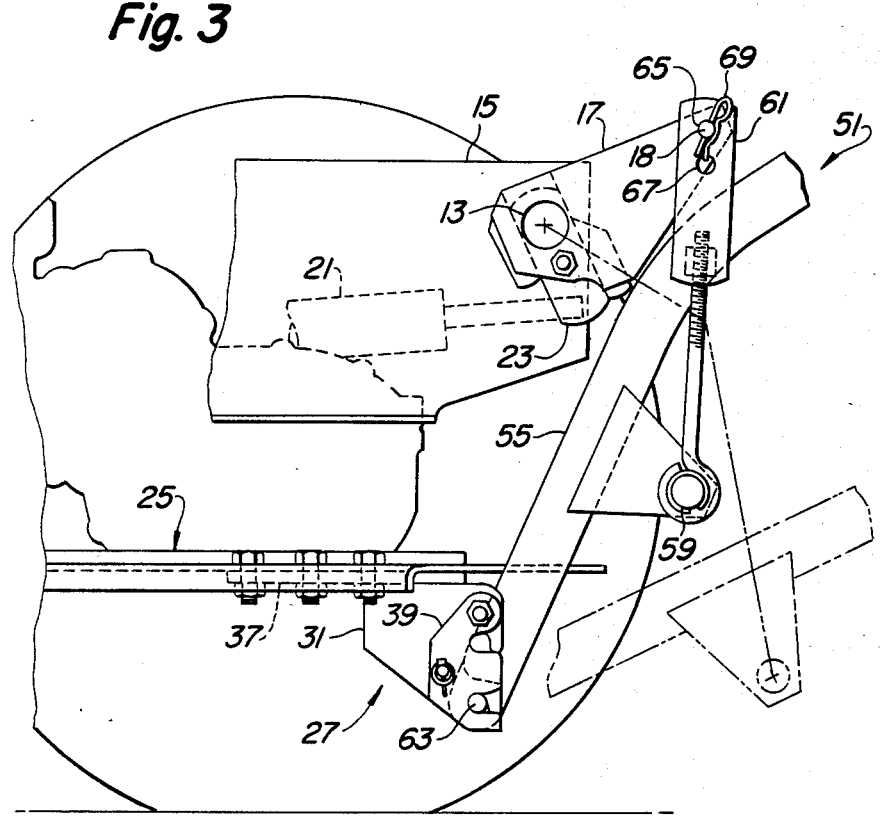
FIG. 3 is a side elevated view of the hitch arrangement.

Referring to FIGS. 1 and 3, the rear portion of a lawn and garden tractor, generally indicated as 11, includes a rock shaft 13 extending transversely across the rearward most portion of the tractor 11, pivotally mounted to and between tractor support plates 15 by any conventional means. The rock shaft 13 includes first and second straps 17 and 19, respectively. Each strap includes an outwardly extending pin 18. A third rock arm strip 23 is fixably mounted to the rock shaft 13. A hydraulic cylinder 21 is pivotally mounted to the tractor 11 at one end and to the third rock arm strip 23 at the other end in a conventional manner such that the actuation of the hydraulic cylinder provides for selective rotation of the rock shaft 13. Fixably mounted to the lower rearward most portion of the vehicle frame 25 is a first and second clamp 27 and 29, respectively, in transversely spaced apart relationship.

Figure 2:
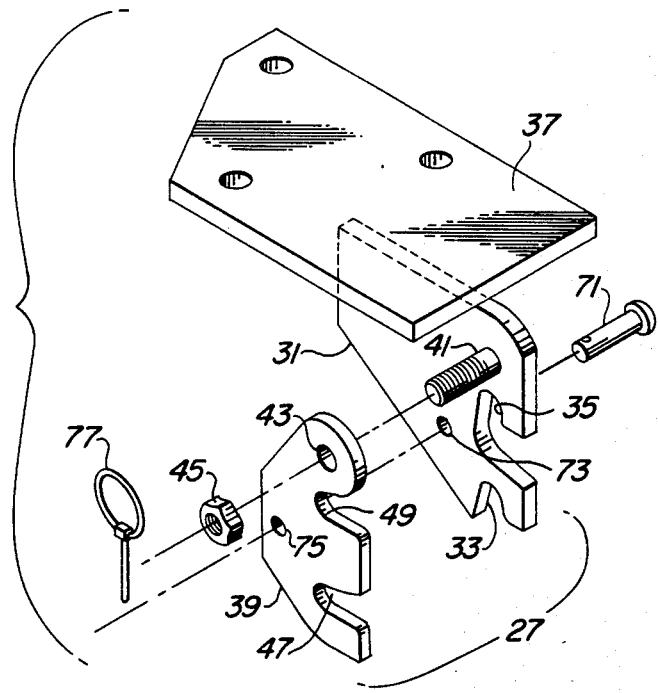
FIG. 2 is an exploded view of the hitch clamp.

Referring to FIGS. 2 and 3, the clamps 27 and 29 are identical in description, therefore, only clamp 27 will be described in detail herein. Clamp 27 includes a lug 31 having a plurality of vertically spaced apart seats 33 and 35. The lug 31 is fixably mounted to a mounting plate 37 by any conventional means such as welding. The mounting plate 37 in turn is fixably mounted to frame portion 25 by any conventional means such as welding. A clip 39 is pivotally mounted by any conventional means to lug 31. One means of mounting clip 39 to lug 31 is to form a threaded stud 41 on lug 31 extending perpendicular therefrom. The stud 41 extends into an aperture 43 in clip 39. A nut 45 is threadably secured to stud 41 to pivotally maintain the clip 39 between the nut 45 and lug 31. The clip 39 includes a plurality of vertically spaced apart generally C-shaped recesses 47 and 49 positioned such that recesses 47 and 49 can be cooperatively positioned with respective seats 33 and 35.

Referring again to FIGS. 1 and 3, an implement support assembly, generally indicated as 51, is fixably mounted by any conventional means such as bolting to a ground engaging implement 53 at one end of the support assembly 51. The support assembly 51 includes first and second lift arms 55 and 57, the rearward end of the lift arms being mounted to the implement 53. A cross shaft 59 is fixably mounted by any conventional means to the lift arms 55 and 57 to maintain the lift arms in parallel spaced apart alignment. A plurality of adjustable elevating arm 61 are pivotally mounted by any conventional means to the cross shaft 59. At the forwardmost end of each lift arm 55 and 57 are pins 63.

The implement 53 can be coupled to the tractor 11 by pivotally attaching the respective elevating arm 61 to a strip 17 by any conventional means such as passing pin 18 through either aperture 65 or 67 in elevating arm 61 and securing a center clip 69 to the end of pin 18. The cylinder 21 can then be used to raise the support assembly 51. By pivoting clip 39, pins 63 can enter a respective one of the seats 33 or 35. Clip 39 can be repositioned to receive pin 63 in a corresponding recess 47 or 49 such that the pin 63 is captured by a respective lug 31 and clip 39. A second pin 71 is received in an aperture 73 of lug 31 and aligned aperture 75 in clip 39. A locking pin 77 is passed through pin 71 and locked. Release of the support assembly can be easily accomplished by removing pins 77 and pivoting clip 39 to release pins 63.

It is observed that the clamps 27 and 29 in conjunction with straps 17 and 19 permit quick and easy attachment of the implements to the tractor 11. Also, the clamps 27 and 29 are easily cleaned.

I claim:

1. A hitch assembly mounted to a tractor for supporting the attachment of an implement support structure, said hitch assembly comprising:
   a rock shaft pivotally mounted to and extending transversely on said tractor, said rock shaft including a plurality of generally outwardly extending straps;
   said tractor having a lower frame portion;

a plurality of clamps fixably mounted to said tractor's lower frame portion in transverse spaced apart relationship, each of said clamps including a lug fixably mounted to said tractor frame having a plurality of vertically positioned and spaced apart seats, and a clip pivotally mounted to said lug having a plurality of vertically positioned and spaced apart generally C-shaped recesses in cooperative position to a respective one of said seats;

said implement support structure having a plurality of lift arms each of said lift arms including a pin extending from said lift arm in such a manner as to be slidably received in a respective one of said seats to be therein captured upon pivoting of said complimenting clip to be received in said C-shaped recesses; and first means for selectively maintaining the relative position between said respective lug and clip upon capture of said pin in said respective seat and recess.

2. A hitch assembly as claimed in claim 1 wherein said first means comprises a second pin journaling transversely through said lug and clip, a plurality of carter clips secured to each end of said pin to locate said lug and clip therebetween.

* * * * *